Patented Dec. 18, 1951

2,579,079

UNITED STATES PATENT OFFICE 2,579,079

INTERPOLYMERS OF MONO-2-ALKENYL ETHERS OF SATURATED MONOHYDRIC ALCOHOLS OR PHENOLS WITH ESTERS OF SATURATED MONOHYDRIC ALCOHOLS OR PHENOLS AND ALPHA-UNSATURATED ALIPHATIC CARBOXYLIC ACIDS

Pliny O. Tawney, Passaic, N. J., assignor to United States Rubber Company, New York, N. Y., a corporation of New Jersey No Drawing. Application November 12, 1948, Serial No. 59,790

9 Claims. (Cl. 260—78.5)

My invention is concerned with a new class of soluble, saturated, (i. e. devoid of aliphatic or cycloaliphatic unsaturation) thermoplastic resins, prepared by interpolymerizing (A) mono-2-alkenyl ethers of saturated (devoid of aliphatic or cycloaliphatic unsaturation) monohydric alcohols or phenols with (B) esters of saturated (devoid of aliphatic or cycloaliphatic unsaturation) monohydric alcohols or phenols and alpha-unsaturated aliphatic carboxylic acids. It further relates to unsaturated derivatives of such interpolymers, produced by alcoholysis of said interpolymers with 2-alkenyl alcohols.

It is known to the art that di-2-alkenyl ethers, e. g., diallyl ether, can be copolymerized with esters of alpha-unsaturated acids such as methyl acrylate, and that alkyl 2-alkenyl ethers can be copolymerized with 2-alkenyl esters of alpha-unsaturated acids, e. g., diallyl maleate. However, these copolymers are cross-linked by virtue of the poly-functionality of the di-2-alkenyl ether in the one case and of the di-2-alkenyl ester of the alpha-unsaturated acid in the other case. Since these copolymers are insoluble and often infusible, they are of limited utility in many commercial applications, particularly in the coating and molding industries where soluble, fusible polymers are often desired.

I have now discovered that soluble thermoplastic resins can be prepared by interpolymerizing a mono-enic 2-alkenyl ether with an ester of an aliphatic alpha-ethylenic carboxylic acid, said ester having the formula

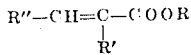

where R is one of the radicals alkyl, cycloalkyl, aryl and aralkyl and is devoid of olefinic unsaturation, R' is one of the radicals hydrogen, methyl, chlorine, and —CH₂COOR, and R'' is one of the radicals hydrogen and —COOR. Examples of R include methyl, ethyl, propyl, butyl, isobutyl, amyl, cyclohexyl, phenyl, tolyl, benzyl, phenethyl. Usually R is lower alkyl. Exemplary of such compounds are methyl acrylate, methyl methacrylate, ethyl chloroacrylate, diethyl fumarate, dimethyl itaconate, dihexyl itaconate, dimethyl maleate, phenyl acrylate, and the methyl and other alkyl esters of chloromaleic, citraconic, mesaconic, and aconitic acids.

A class of esters which is especially suitable for use in my invention includes the alkyl (especially the lower alkyl) esters of alpha-ethylenic alkenedioic acids or ethylenic dicarboxylic acids, especially maleic and fumaric acids.

Copolymerizable mono-2-alkenyl ethers suitable for use in my invention have the formula CH₂=CR'—CH₂—O—R where R' is hydrogen, halogen (especially chlorine) or alkyl (especially methyl), and R is alkyl, cycloalkyl, aryl, or aralkyl as defined above. R may be exemplified as before. Again R is usually lower alkyl. Illustrative of such ethers are allyl methyl ether, methallyl ethyl ether, chloroallyl ethyl ether, methallyl methyl ether, methallyl benzyl ether, and allyl butyl ether. The amount of such ether which I employ is from 0.25 to 6 mols of said mono-2-alkenyl ether per mol of said ester.

Although the mono-2-alkenyl ethers homopolymerize only to a very slight extent, I have found that they can be readily interpolymerized with the esters of alpha-unsaturated acids to obtain good yields of relatively high molecular weight products. For the preparation of my new interpolymers I carry out the polymerization reaction in the temperature range of about 25° C. to 120° C. and in the presence or absence of solvents, diluents, emulsifying agents, and polymerization regulators which lower the molecular weight such as chlorinated olefines, e. g., methallyl chloride. The interpolymerization may be carried out in glass-lined vessels and under a blanket of inert gas to insure the production of a colorless and uncontaminated product.

To accelerate the interpolymerization I use inorganic peroxides (e. g., hydrogen peroxide) and peroxy salts (e. g., peroxycarbonates, peroxyborates, and peroxysulphates) for polymerization in aqueous emulsion; while for polymerization carried out en masse or in solution I have found organic peroxides such as acetyl peroxide, benzoyl peroxide, tertiary-butyl hydrogen peroxide, lauroyl peroxide and succinyl peroxide to be satisfactory.

By reacting a mixture of the monomers in the presence of suitable solvents, a solution of the interpolymer is obtained which can be employed directly as a coating or impregnating composition. The interpolymers prepared by emulsion polymerization are obtained as milky latices which may be used in a variety of ways. Plasticizers and softening agents can be conveniently incorporated with the interpolymers to produce rubber-like products, by adding them to the solutions or emulsions of the interpolymers. The interpolymers may be removed from solution by precipitating them to the solutions or emulsions of the interpolymers. The interpolymers may be removed from solution by precipitating them with a non-solvent such as an aliphatic hydrocarbon, e. g., n-hexane, and from emulsions by flocculating them with electrolytes. The products may be further purified by extracting any unreacted starting materials with solvents, and drying. I can thus obtain products suitable for use as adhesives, in the impregnation of porous materials, in the water-proofing of textiles, paper and leather, and for the preparation of cast and molded articles such as rods, blocks, sheets, films and tubes. By dissolving the interpolymers in appropriate solvents they can be used as lacquers and coatings. Since my products are usually transparent they can be readily colored with dyes and pigments.

The interpolymers of my invention, as thus far described, are characterized by being saturated, i. e., being free from unsaturation in any aliphatic or cycloaliphatic part of the molecules of the interpolymer. Practically this means that all of the unsaturation of the combining monomers is removed by the interpolymerization but of course does not refer to what is sometimes termed unsaturation in the benzene ring which is not true ethylenic unsaturation. The interpolymers of my invention are thermoplastic and are soluble in the usual solvents; they are incapable, because of their saturated nature, of being converted to insoluble, infusible state by further polymerization.

My copolymers are of further utility by virtue of their high degree of solubility in 2-alkenyl alcohols such as allyl, methallyl, chloroallyl and crotyl alcohols. This permits an alcohol interchange reaction to be carried out by dissolving the interpolymer in a 2-alkenyl alcohol, e. g., allyl alcohol, and heating, thus avoiding the use of a mutual solvent such as is normally required in the alcoholysis of polymers such as polymethyl acrylate. By this reaction, soluble, unsaturated resins are obtained which are convertible to insoluble, infusible products by further polymerization. The amount of unsaturation introduced into the interpolymers by the alcoholysis reaction can be varied by controlling the length of time that the 2-alkenyl alcohol and the polymer are in contact. When long reaction times are involved, polymerization inhibitors such as copper or hydroquinone may be added to the reaction mixture to avert premature polymerization of the alcoholyzed product.

In effecting such alcohol interchange I may employ any 2-alkenyl alcohol having the formula $R^*CH{=}CR^*{-}CH_2{-}OH$ where one $R^*$ is hydrogen and the other $R^*$ is hydrogen, chlorine or alkyl, especially lower alkyl, particularly methyl or ethyl, and in which said interpolymer is soluble. Exemplary of such alcohols are allyl, methallyl, 2-chloroallyl, ethallyl and crotyl alcohols.

The amount of 2-alkenyl alcohol used in effecting the alcoholysis will depend upon many factors and can be varied within wide limits. In general I prefer to employ a great excess of the 2-alkenyl alcohol, for example from 5 to 15 mols thereof per molar equivalent of alkyl, cycloalkyl, aryl or aralkyl radicals present on the interpolymerized ester groups in the interpolymer.

A conventional esterification catalyst, of either the basic type (e. g., sodium hydroxide) or the acidic type (e. g., p-toluenesulfonic acid), is used to accelerate the alcohol interchange. When a 2-alkylallyl alcohol, e. g., methallyl alcohol, is used a basic catalyst is preferred since acids tend to bring about the undesirable rearrangement of some substituted 2-propenyl alcohols to aldehydes.

When large amounts of unsaturation are to be introduced into the interpolymer by alcoholysis, it is desirable that the ester component of the initial copolymer shall be the ester of a saturated aliphatic monohydric alcohol having a boiling point appreciably lower than that of the 2-alkenyl alcohol which displaces it in the copolymer. The reaction temperature in such case can be adjusted so that the alcohol liberated during the reaction can readily be removed by continuous or intermittent distillation. When the alcoholysis reaction has proceeded to the desired degree, unchanged 2-alkenyl alcohol is removed by distillation or extraction, and the alcoholyzed polymer is purified by dissolving it in a solvent such as acetone and precipitating it with a non-solvent such as n-hexane.

The pure, alcoholyzed product is a clear, thermoplastic material soluble in many organic solvents. At elevated temperatures in the presence of polymerization catalysts it can be converted to a hard, transparent insoluble, infusible resin. It is particularly adapted to uses in molding, coating, impregnating and laminating operations where pre-formed articles capable of being "set" or cured are desired. Compatible plasticizers, softening agents, pigments and fillers may be incorporated with the resin in its soluble, thermoplastic stage prior to the final cure.

The unsaturated alcoholyzed interpolymers can be copolymerized with a wide variety of reactive unsaturated monomers, particularly compounds of the vinyl, acrylic, and allyl types, such as vinyl acetate, methyl acrylate, tetrahydrofurfuryl acrylate, methyl methacrylate, diethyl fumarate, allyl methacrylate, diallyl fumarate, diallyl phthalate, etc. Furthermore, the alcoholyzed interpolymers are miscible over a wide range of proportions with many monomers of the above-mentioned types of copolymerizable monomers, and solutions containing high concentrations of the alcoholyzed interpolymers in the copolymerizable monomers generally possess sufficiently low viscosities to permit application by brushing, spraying or dipping. Elevated temperatures and/or polymerization catalysts rapidly convert these compositions to insoluble, infusible products with a minimum of the cracking, shrinking and "blowing" often associated with the elimination of a volatile, non-polymerizable solvent from films of coating compositions.

An increase in the percentage of 2-alkenyl radicals introduced into the interpolymer by alcoholysis results in a substantial increase in the solubility of the alcoholyzed interpolymers in copolymerizable monomers and a corresponding increase in the rate at which these soluble interpolymers can be converted into insoluble and infusible products. These effects are particularly marked in those interpolymers containing more 2-alkenyl than alkyl, cycloalkyl, aryl or aralkyl groups derived from interpolymerized ester groups.

The following examples disclose the practice of my invention in more detail. All parts are by weight.

EXAMPLE 1

This illustrates the preparation of the binary interpolymers of my invention. In the table are recorded the proportions of the reacting monomers, reaction times at 60° C., weights of peroxide catalyst, yields and approximate composition of the product.

The products are isolated and purified by dissolving them in acetone and precipitating with a commercial grade of n-hexane, and after being dried in vacuo to constant weight, they are analyzed and found to be interpolymers containing substantial amounts of both components in all cases. All of these products display a high solubility in 2-alkenyl alcohols, particularly in allyl and methallyl alcohols.

Table

| Copolymerizable Monomer | Parts | Methallyl Ethyl Ether (parts) | Benzoyl Peroxide (parts) | Reaction Time (Hours) | Yield (parts) | Analysis (weight %) | | Composition of copolymer | |
|---|---|---|---|---|---|---|---|---|---|
| | | | | | | Carbon | Hydrogen | Copolymerizable Monomer | Methallyl Ethyl Ether |
| Methyl Acrylate | 18.0 | 82.0 | 1.24 | 4.0 | 23.0 | 62.71 | 9.05 | 57.6 | 42.4 |
| Do | 46.8 | 53.2 | 1.29 | 1.75 | 45.7 | 60.33 | 8.38 | 72.0 | 28.0 |
| Methyl Methacrylate | 50.0 | 50.0 | 1.21 | 23.5 | 65.4 | 62.96 | 9.18 | 75.2 | 24.8 |
| Diethyl Fumarate | 29.5 | 70.5 | 1.04 | 19.5 | 13.8 | 60.97 | 8.54 | 68.2 | 31.8 |
| Do | 63.2 | 36.8 | 0.89 | 19.5 | 17.4 | 59.80 | 8.13 | 75.4 | 24.6 |
| Dimethyl Itaconate | 61.1 | 38.9 | 0.93 | 20.0 | 43.6 | 54.71 | 6.77 | 91.7 | 8.3 |

EXAMPLE 2

An interpolymer similar to that of the second run listed in Table 1 above is prepared by heating a mixture of 100 parts of methallyl ethyl ether, 86 parts of methyl acrylate and 1.84 parts of benzoyl peroxide for 5.5 hours at reflux. Analysis of the purified material indicates that it contains approximately 28% by weight of interpolymerized methallyl ethyl ether. Fifty-seven parts of this material are dissolved in 285 parts of methallyl alcohol and heated at reflux for 11.5 hours in the presence of 0.3 part of sodium hydroxide catalyst. The product is purified by distilling off unreacted methallyl alcohol under reduced pressure and extracting the residue with n-hexane in which the polymer is insoluble. This treatment yields a clear, plastic solid which is soluble in acetone.

Upon being heated at 100° C. for several hours this alcoholyzed interpolymer is converted from a soluble, thermoplastic material to an insoluble, infusible resin.

Similar results are obtained by alcoholysis of the other interpolymers illustrated in Example 1.

EXAMPLE 3

This exemplifies the copolymerization of my alcoholized interpolymers with reactive unsaturated monomers.

Eleven parts of the alcoholyzed interpolymer of Example 2 are dissolved in 4.7 parts of tetrahydrofurfuryl acrylate together with 0.31 part of benzoyl peroxide catalyst. The mixture is heated at 60° C. for 50 minutes during which time the solution solidifies to a clear hard resin which is substantially infusible and insoluble in organic solvents.

A solution of 6 parts of the alcoholyzed interpolymer of Example 2 in 4 parts of diethyl fumarate is admixed with 0.2 part of benzoyl peroxide and flowed onto a metal panel. After baking at 200° C. for 30 minutes a tough adherent film results which is not attacked by acetone or xylene.

Having thus described my invention, what I claim and desire to protect by Letters Patent is:

1. A soluble, saturated interpolymer of monomers consisting of (A) a monoenic 2-alkenyl ether having the formula $$CH_2=CR'-CH_2-O-R$$

where R' is selected from the group consisting of hydrogen, halogen and alkyl and R is selected from the group consisting of alkyl, cycloalkyl, aryl and aralkyl and (B) an ester of an alpha-ethylenic aliphatic carboxylic acid, said ester having the formula $$R''-CH=C-COOR$$
$$|$$
$$R'$$

where R is a radical selected from the group consisting of alkyl, cycloalkyl, aryl and aralkyl, R' is a radical selected from the group consisting of hydrogen, methyl, chlorine, and $$-CH_2-COOR$$

where R is as before; and R'' is a radical selected from the group consisting of hydrogen and —COOR where R is as before, the amount of said ether employed ranging from 0.25 to 6 mols per mol of said ester.

2. The method of preparing soluble, saturated interpolymers which comprises heating a polymerizable mixture of monomers consisting of (A) a monoenic 2-alkenyl ether having the formula $$CH_2=CR'-CH_2-O-R$$

where R' is selected from the group consisting of hydrogen, halogen and alkyl and R is selected from the group consisting of alkyl, cycloalkyl, aryl and aralkyl and (B) an ester of an alpha-ethylenic aliphatic carboxylic acid, said ester having the formula $$R''-CH=C-COOR$$
$$|$$
$$R'$$

where R is a radical selected from the group consisting of alkyl, cycloalkyl, aryl and aralkyl, R' is a radical selected from the group consisting of hydrogen, methyl, chlorine, and $$-CH_2-COOR$$

where R is as before; and R'' is a radical selected from the group consisting of hydrogen and —COOR where R is as before, the amount of said ether employed ranging from 0.25 to 6 mols per mol of said ester, with a peroxygen compound as catalyst until a soluble, saturated interpolymer of said ether and said ester is formed.

3. A soluble, saturated interpolymer of monomers consisting of an alkyl 2-alkenyl ether in which the 2-alkenyl group contains a terminal methylene group and an alkyl ester of an acrylic acid having a terminal methylene group, the amount of said ether employed ranging from 0.25 to 6 mols per mol of said ester.

4. A soluble, saturated interpolymer of monomers consisting of an alkyl 2-alkenyl ether in which the 2-alkenyl group contains a terminal methylene group and methyl acrylate, the amount of said ether employed ranging from 0.25 to 6 mols per mol of said methyl acrylate.

5. A soluble, saturated interpolymer of monomers consisting of an alkyl 2-alkenyl ether in which the 2-alkenyl group contains a terminal methylene group and methyl methacrylate, the amount of said ether employed ranging from 0.25 to 6 mols per mol of said methyl methacrylate.

6. A soluble, saturated interpolymer of monomers consisting of an alkyl 2-alkenyl ether in which the 2-alkenyl group contains a terminal methylene group and a di-alkyl ester of an alpha-ethylenic alkenedioic acid, the amount of said ether employed ranging from 0.25 to 6 mols per mol of said ester.

7. A soluble, saturated interpolymer of monomers consisting of an alkyl 2-alkenyl ether in which the 2-alkenyl group contains a terminal methylene group with diethyl fumarate, the amount of said ether employed ranging from 0.25 to 6 mols per mol of said diethyl fumarate.

8. A soluble interpolymer containing ethylenic unsaturation and being capable of further polymerization and interpolymerization, and consisting of the product formed by the alcoholysis, with a 2-alkenyl alcohol having the formula $$R^*CH=CR^*-CH_2-OH$$

where one $R^*$ is hydrogen and the other $R^*$ is selected from the group consisting of hydrogen, chlorine and alkyl, of a soluble, saturated interpolymer of a polymerizable mixture of monomers consisting of (A) a monoenic 2-alkenyl ether having the formula $$CH_2=CR'-CH_2-O-R$$

where R' is selected from the group consisting of hydrogen, halogen and alkyl and R is selected from the group consisting of alkyl, cycloalkyl, aryl and aralkyl and (B) an ester of an alpha-ethylenic carboxylic acid, said ester having the formula $$R''-CH=C-COOR$$
$$\phantom{R''-CH=C-}|$$
$$\phantom{R''-CH=C-}R'$$

wherein R is a radical selected from the group consisting of alkyl, cycloalkyl, aryl and aralkyl, R' is a radical selected from the group consisting of hydrogen, methyl, chlorine, and $$-CH_2-COOR$$

where R is as before; and R'' is a radical selected from the group consisting of hydrogen and —COOR where R is as before, the amount of said ether employed ranging from 0.25 to 6 mols per mol of said ester, the amount of said 2-alkenyl alcohol employed ranging from 5 to 16 mols per molar equivalent of saturated hydrocarbon radicals present in the interpolymerized ester groups in said saturated interpolymer, said alcoholysis being effected by heating a solution of said saturated interpolymer in said 2-alkenyl alcohol.

9. The process of preparing soluble, unsaturated convertible interpolymeric esters which comprises heating a solution of (A) a soluble, saturated interpolymer of monomers consisting of a mono-enic 2-alkenyl ether having the formula $$CH_2=CR'-CH_2-O-R$$

where R' is selected from the group consisting of hydrogen, halogen and alkyl and R is selected from the group consisting of alkyl, cycloalkyl, aryl and aralkyl and an ester of an alpha-ethylenic carboxylic acid, said ester having the formula $$R''-CH=C-COOR$$
$$\phantom{R''-CH=C-}|$$
$$\phantom{R''-CH=C-}R'$$

wherein R is a saturated radical selected from the group consisting of alkyl, cycloalkyl, aryl and aralkyl, R' is a radical selected from the group: hydrogen, methyl, chlorine, and $$-CH_2-COOR$$

where R is as before; and R'' is one of the radicals hydrogen and —COOR where R is as before, in proportions of from 0.25 to 6 mols per mol of said ester, in (B) a 2-alkenyl alcohol having the formula $$R^*CH=CR^*-CH_2-OH$$

where one $R^*$ is hydrogen and the other $R^*$ is selected from the group consisting of hydrogen, chlorine and alkyl, in which said saturated interpolymer is soluble, in the presence of, (C) an esterification catalyst, in the absence of a mutual solvent for said interpolymer and said 2-alkenyl alcohol, the relative proportions of said saturated interpolymer and said 2-alkenyl alcohol being such that there is present from 5 to 15 mols of said alcohol per molar equivalent of saturated hydrocarbon radicals of the ester units in said saturated interpolymer, until such a proportion of the saturated hydrocarbon groups of the ester units in said saturated interpolymer has been replaced by 2-alkenyl groups derived from said alcohol that the resulting unsaturated interpolymer is convertible to insoluble, infusible form by further polymerization.

PLINY O. TAWNEY.

REFERENCES CITED

The following references are of record in the file of this patent:

UNITED STATES PATENTS

| Number | Name | Date |
|---|---|---|
| 2,335,962 | Pollack et al. | Dec. 7, 1943 |
| 2,378,195 | D'Alelio | June 12, 1945 |
| 2,378,197 | D'Alelio | June 12, 1945 |
| 2,415,400 | Armstrong | Feb. 11, 1947 |
| 2,431,374 | D'Alelio | Nov. 25, 1947 |
| 2,457,872 | D'Alelio | Jan. 4, 1949 |
| 2,462,817 | Smith | Feb. 22, 1949 |
| 2,496,384 | DeNie | Feb. 7, 1950 |